US007000023B2

(12) United States Patent
Chiba

(10) Patent No.: US 7,000,023 B2
(45) Date of Patent: Feb. 14, 2006

(54) INFORMATION TRANSFER APPARATUS AND METHOD TRANSFERRING TO ANOTHER TERMINAL INFORMATION TRANSMITTED FROM SERVER TO CLIENT, AND MACHINE-READABLE RECORDING MEDIUM RECORDED WITH PROGRAM REALIZING INFORMATION TRANSFER METHOD

(75) Inventor: Masahiro Chiba, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 784 days.

(21) Appl. No.: 09/838,317

(22) Filed: Apr. 20, 2001

(65) Prior Publication Data

US 2001/0047403 A1 Nov. 29, 2001

(30) Foreign Application Priority Data

May 24, 2000 (JP) ............................ 2000-152835

(51) Int. Cl.
*G06F 13/00* (2006.01)

(52) U.S. Cl. ...................................... 709/232; 715/864

(58) Field of Classification Search ................ 715/744, 715/746, 733, 864, 866; 709/232, 230, 217; 345/746, 744, 733, 864, 866

See application file for complete search history.

(56) References Cited

U.S. PATENT DOCUMENTS 5,801,691 A * 9/1998 Dahl .......................... 345/746
6,076,109 A * 6/2000 Kikinis ....................... 709/228
6,300,947 B1 * 10/2001 Kanevsky ................... 715/866
6,417,873 B1 * 7/2002 Fletcher et al. ............. 345/853
6,473,609 B1 * 10/2002 Schwartz et al. ........... 455/406
6,477,529 B1 * 11/2002 Mousseau et al. ............. 707/5
6,499,021 B1 * 12/2002 Abu-Hakima ................ 706/10
6,538,673 B1 * 3/2003 Maslov ....................... 345/853
6,549,221 B1 * 4/2003 Brown et al. ............... 345/854
6,590,588 B1 * 7/2003 Lincke et al. ............... 345/744
6,593,944 B1 * 7/2003 Nicolas et al. .............. 715/744
6,633,314 B1 * 10/2003 Tuli ........................... 345/744
6,684,087 B1 * 1/2004 Yu et al. ..................... 455/566
6,690,394 B1 * 2/2004 Harui ......................... 345/762
6,690,403 B1 * 2/2004 Tuli ........................... 345/854
2003/0011631 A1 * 1/2003 Halahmi ..................... 345/744
2004/0100509 A1 * 5/2004 Sommerer et al. .......... 345/864
2004/0100510 A1 * 5/2004 Milic-Frayling et al. .... 345/864

FOREIGN PATENT DOCUMENTS

EP 0 987 868 3/2000
JP 9-322147 12/1997
WO WO 00/13100 3/2000
WO WO 00/39666 7/2000

* cited by examiner

*Primary Examiner*—Kenneth R. Coulter
(74) *Attorney, Agent, or Firm*—Nixon & Vanderhye P.C.

(57) ABSTRACT

A transfer apparatus transfers a data item included in a web page to a predetermined terminal. The transfer apparatus includes a data region extraction unit extracting a plurality of data items from a web page transmitted towards a client computer, a button-added web page generation unit generating transmission data causing a select button of a relevant data item to appear in response to specifying a display region of the corresponding data item at the client computer according to the extracted data item, and a data format conversion unit receiving request data from a client computer in response to transmission data, and converting the data format of the requested data for transfer to a terminal.

28 Claims, 16 Drawing Sheets

| | TRANSMISSION INFORMATION FORMAT | TRANSMISSION DESTINATION | CONNECTION DESTINATION |
|---|---|---|---|
| USER A | e-mail | aaa@mail.com | INTERNET |
| USER B | FAX | 0123-45-6789 | PUBLIC NETWORK |
| USER C | CELLULAR TELEPHONE | 090-1234-5678 | PUBLIC NETWORK |
| ⋮ | ⋮ | ⋮ | ⋮ |

```
<HTML>
<HEAD><TITLE>sample</TITLE></HEAD>
<BODY>
<CENTER>

<br>
<IMG SRC="sample.gif"><br><br>                    —322
<br>

<table>
<tr>
<td>
△△△△△△△△△△<br>
○○○○○○○○○○○○○○○○○○○○○○<br>
○○○○○○○○○○○○○○○○○○○○○○<br>
○○○○○○○○○○○○○○○○○○○○○○<br>                        —324
○○○○○○○○○○○○○○○○○○○○○○<br>
</td>
</tr>
</table>
<br>

<table>
<tr>
<td>
△△△△△△△△△△<br>
○○○○○○○○○○○○○○○○○○○○○○<br>
○○○○○○○○○○○○○○○○○○○○○○<br>
○○○○○○○○○○○○○○○○○○○○○○<br>                        —326
○○○○○○○○○○○○○○○○○○○○○○<br>
</td>
</tr>
</table>
<br>

</BODY>
</HTML>
```

```
<HEAD>

<SCRIPT LANGUAGE="JavaScript">

var sample_dataconv_cgi = "http://sample.com/cgi-bin/func.cgi"

function sample_showbutton(btn) {
      btn.style.display = " "
}                                                              ~342

function sample_hidebutton(btn) {
      btn.style.display = "none"
}                                                              ~344

function sample_showrange(prg) {
      prg.style.backgroundColor = "LightGoldenrodYellow"
}                                                              ~346

function sample_hiderange(prg) {
      prg.style.backgroundColor = " "
}                                                              ~348

function sample_getcontent(prg) {
      var str = escape(prg.innerText);
      location =
sample_dataconv_cgi+"?DATA="+str+"&USR=chiba&BRW=pc&URL=http://
tokkyo/tokkyo.htm";
}                                                              ~350

</SCRIPT>

<STYLE TYPE="text/css">

SPAN.paragraph{ }
SPAN.funcpupbtn{ position:absolute; z-index:9999 }

</STYLE>                                                       ~352

<TITLE>sample</TITLE></HEAD>
```

```
<BODY>
<CENTER>

<br>
<IMG SRC="sample.gif"><br><br>
<br>

<table>
<tr>
<td>
<SPAN id="prg0" class="paragraph"                                   362
        onmouseover="tscom_showbutton(btn0)"
        onmouseout="tscom_hidebutton(btn0)">
<SPAN id="btn0" class="funcpupbtn" STYLE="display:none"
        onmouseover="tscom_showrange(prg0)"
        onmouseout="tscom_hiderange(prg0)"
        onmouseup="tscom_getcontent(prg0)">
<IMG src="btn.gif">                                                 364
</SPAN>
△△△△△△△△△△<br>
○○○○○○○○○○○○○○○○○○○○○○○○<br>
○○○○○○○○○○○○○○○○○○○○○○○○<br>
○○○○○○○○○○○○○○○○○○○○○○○○<br>
○○○○○○○○○○○○○○○○○○○○○○○○<br>                                     366
</SPAN>

</td>
</tr>
</table>
<br>

<table>
<tr>
<td>
<SPAN id="prg1" class="paragraph"                                   368
        onmouseover="tscom_showbutton(btn1)"
        onmouseout="tscom_hidebutton(btn1)">
<SPAN id="btn1" class="funcpupbtn" STYLE="display:none"
        onmouseover="tscom_showrange(prg1)"
        onmouseout="tscom_hiderange(prg1)"
        onmouseup="tscom_getcontent(prg1)">
<IMG src="btn.gif">                                                 370
</SPAN>
△△△△△△△△△△<br>
○○○○○○○○○○○○○○○○○○○○○○○○<br>
○○○○○○○○○○○○○○○○○○○○○○○○<br>
○○○○○○○○○○○○○○○○○○○○○○○○<br>
○○○○○○○○○○○○○○○○○○○○○○○○<br>                                     372
</SPAN>

</td>
</tr>
</table>
<br>

</BODY>
```

FIG. 12

| | TRANSMISSION INFORMATION FORMAT | TRANSMISSION DESTINATION | CONNECTION DESTINATION |
|---|---|---|---|
| USER A | e-mail | aaa@mail.com | INTERNET |
| | FAX | 0123-45-6789 | PUBLIC NETWORK |
| USER B | e-mail | bbb@mail.com | INTERNET |
| | FAX | 0987-65-4321 | PUBLIC NETWORK |
| USER C | CELLULAR TELEPHONE | 090-1234-5678 | PUBLIC NETWORK |
| | e-mail | ccc@mail.com | INTERNET |
| ⋮ | ⋮ | ⋮ | ⋮ |

```
<HEAD>

<SCRIPT LANGUAGE="JavaScript">

var sample_mailconv_cgi = "http://sample.com/cgi-bin/mail.cgi";
var sample_faxconv_cgi = "http://sample.com/cgi-bin/fax.cgi";
                                                                    502
function sample_showbutton(btn,btnimg) {
      var idx = document.select.func.selectedIndex;
      var val = document.select.func.options[idx].value;             504
      if( val == "mail" ){
         btnimg.src = "mail.gif";
      }
      else if( val == "fax" ){
         btnimg.src = "fax.gif";                                      506
      }
      btn.style.display = " ";                                        508
}

function sample_hidebutton(btn) {
      btn.style.display = "none";                                     510
}

function sample_showrange(prg) {
      prg.style.backgroundColor = "LightGoldenrodYellow";             512
}

function sample_hiderange(prg) {
      prg.style.backgroundColor = " ";                                514
}

function sample_getcontent(prg) {
      var idx = document.select.func.selectedIndex;
      var val = document.select.func.options[idx].value;             518
      var str = escape(prg.innerText);
      if( val == "mail" ){                                            516
         location =
sample_mailconv_cgi+"?DATA="+str+"&USR=chiba&BRW=pc&URL=http://
tokkyo/tokkyo.htm";
      }
      else if( val == "fax" ){
         location =                                                   520
sample_faxconv_cgi+"?DATA="+str+"&USR=chiba&BRW=pc&URL=http://
tokkyo/tokkyo.htm";
      }
}

</SCRIPT>
                                                                    522
<STYLE TYPE="text/css">

SPAN.paragraph{ }
SPAN.funcpupbtn{ position:absolute; z-index:9999 }

</STYLE>

<TITLE>sample</TITLE></HEAD>
```

```
<BODY>
<FORM NAME="select">                                              532
<SELECT NAME="func">
     <OPTION VALUE="mail">mail
     <OPTION VALUE="fax">fax
</SELECT>
</FORM>
<CENTER>

<br>
<IMG SRC="sample.gif"><br><br>
<br>

<table>
<tr>
<td>
<SPAN id="prg0" class="paragraph"                                 534
       onmouseover="sample_showbutton(btn0,btnimg0)"
       onmouseout="sample_hidebutton(btn0)">
<SPAN id="btn0" class="funcpupbtn" STYLE="display:none"           536
       onmouseover="sample_showrange(prg0)"
       onmouseout="sample_hiderange(prg0)"
       onmouseup="sample_getcontent(prg0)">
<IMG src="mail.gif" name="btnimg0">
</SPAN>
△△△△△△△△△△<br>
○○○○○○○○○○○○○○○○○○○○○○○<br>
○○○○○○○○○○○○○○○○○○○○○○○<br>
○○○○○○○○○○○○○○○○○○○○○○○<br>
○○○○○○○○○○○○○○○○○○○○○○○<br>
</SPAN>                                                           538

</td>
</tr>
</table>
<br>

<table>
<tr>
<td>
<SPAN id="prg1" class="paragraph"                                 540
       onmouseover="sample_showbutton(btn1,btnimg1)"
       onmouseout="sample_hidebutton(btn1)">
<SPAN id="btn1" class="funcpupbtn" STYLE="display:none"           542
       onmouseover="sample_showrange(prg1)"
       onmouseout="sample_hiderange(prg1)"
       onmouseup="sample_getcontent(prg1)">
<IMG src="mail.gif" name="btnimg1">
</SPAN>
△△△△△△△△△△<br>
○○○○○○○○○○○○○○○○○○○○○○○<br>
○○○○○○○○○○○○○○○○○○○○○○○<br>
○○○○○○○○○○○○○○○○○○○○○○○<br>
○○○○○○○○○○○○○○○○○○○○○○○<br>
</SPAN>                                                           544

</td>
</tr>
</table>
<br>

</BODY>
```

INFORMATION TRANSFER APPARATUS AND METHOD TRANSFERRING TO ANOTHER TERMINAL INFORMATION TRANSMITTED FROM SERVER TO CLIENT, AND MACHINE-READABLE RECORDING MEDIUM RECORDED WITH PROGRAM REALIZING INFORMATION TRANSFER METHOD

BACKGROUND OF THE INVENTION

1. Field of the Invention

The present invention relates to the art of data communication between server and clients connected to a network, particularly the art to transfer data received from a server to another information communication terminal.

2. Description of the Background Art

Data such as a web page received from a WWW (World Wide Web) server connected to the Internet can be browsed using a browse software (referred to as "browser" hereinafter) executed on a computer. PDA (Personal Digital Assistant), cellular telephones, mail dedicated terminals, pagers, and the like are known in addition to computers as information communication terminals that can browse data. By transferring data such as a web page browsed by the computer to these information communication terminals, data can be readily browsed at sites away from home and offices.

Such information communication terminals have limitation in the size of the display screen for the sake of improving the portability and in the memory capacity to suppress the cost. These information communication devices differ in their data format that can be displayed depending upon their types. The number of types of data that can be displayed is less than those for a computer. Therefore, the user has to convert the format of the data in the web page for transfer to an information communication terminal according to the function (displayable data format, displayable data amount, and the like) of a predetermined information communication terminal. Such operations require a great amount of labor.

SUMMARY OF THE INVENTION

An object of the present invention is to provide an information transfer apparatus and method for a user to easily transfer information such as a web page to a predetermined information communication terminal.

Another object of the present invention is to provide an information transfer apparatus and method for the user to easily select required information and transfer the selected information to a predetermined information communication terminal.

A further object of the present invention is to provide an information transfer apparatus and method for a user to easily select required information and transfer the selected information to a predetermined information communication terminal based on displayed information.

Still another object of the present invention is to provide an information transfer apparatus and method for a user to transfer information together with selected information added to a predetermined information communication terminal.

A still further object of the present invention is to provide an information transfer apparatus and method for a user to transfer selected information to a predetermined information communication terminal without being aware of the data format that can be displayed at the information communication terminal.

According to an aspect of the present invention, an information transfer apparatus transfers to a predetermined terminal information transmitted from a server connected to a network to a client. The information transfer apparatus includes a communication circuit connected to the network for transmitting and receiving information with respect to another apparatus, a terminal information storage circuit storing terminal information of a terminal to which information is to be transferred, a first reception circuit connected to the communication circuit for receiving information including a plurality of data items that is transmitted from the server to the client, a data storage circuit connected to the communication circuit for storing information received by the first reception circuit, a data transmission circuit connected to the communication circuit for extracting a plurality of data items from the information transmitted towards the client, and transmitting to the client the extracted data items and interface information that realizes at the client an interface to display the information in whole and to select respective data items corresponding to the selected data items, based on the extracted data items, a second reception circuit connected to the communication circuit for receiving from the client transfer request data requesting transfer of a data item selected from the extracted plurality of data items to a terminal, and a transfer circuit connected to the communication circuit, the data storage circuit, and the terminal information storage circuit for converting the data item into a data format corresponding to a terminal of a predetermined transfer destination stored in the terminal information storage circuit, based on the transfer request data received by the second reception circuit.

By the interface realized at the client, the data item to be transferred to a terminal can be selected out from a plurality of data items included in the information transmitted from the server to the client. Even in the case where a button appears to select a data item to be transferred to a terminal by the interface realized at the client, a data item can be selected based on the display of data items since the entire information including the extracted data items are displayed (that is, the data item is not hidden by that button). The data item selected by the user is converted into a data format that can be browsed by the user's terminal and then transferred thereto. Thus, an information transfer apparatus is provided that allows the user to easily transfer required information such as a web page to a predetermined information communication terminal.

Further preferably, the data transmission circuit includes a circuit for extracting a plurality of data items from the information transmitted towards the client, and transmitting to the client the extracted data items and interface information that realizes at the client an interface appearing in response to specifying a display region of a data item corresponding to an extracted data item to select respective data items corresponding to the extracted data items, based on the extracted data items.

For example, an interface is realized at a client that causes appearance of a select button to select a data item that is to be transferred to a terminal when a pointing device such as a mouse points to a display region of a data item, and that causes display of the entire information including the data items without the appearance of a select button if the mouse or the like does not designate a display region of a data item. Thus, an information transfer apparatus is provided that allows a user to easily transfer required information such as a web page to a predetermined information communication terminal.

Further preferably, the transfer circuit includes a circuit for converting a data item into a data format corresponding to a terminal of a predetermined transfer destination stored in the terminal information storage circuit and adding information other than the data item received from the server to the converted data item for transmission to the terminal, based on the transfer request data received by the reception circuit.

The transfer circuit converts the data into the data format corresponding to the transfer destination terminal, and adds information other than the data received from the server to the converted data for transfer to the terminal. For example, a data item added with advertisement data of an enterprise providing the service of the information transfer apparatus, data of the transmitter and the like can be transferred to the terminal. Thus, an information transfer apparatus is provided that allows a user to add data to required information such as a web page and transfer the same to a predetermined information communication terminal.

Further preferably, the information transfer apparatus further includes a terminal information reception circuit connected to the communication circuit for receiving terminal information from a client and storing the terminal information in the terminal information storage circuit.

The terminal information reception circuit receives terminal information from a client and stores the received terminal information in the terminal information storage circuit. The client can register, modify and delete information of a terminal to which information is to be transferred (the allowable data format for display, destination address, and the like for each user terminal). Thus, an information transfer apparatus is provided that allows a user to transfer required information such as a web page easily to a predetermined information communication terminal.

According to another aspect of the present invention, an information transfer method transfers to a predetermined terminal information transmitted from a server connected to a network to a client. The information transfer method includes the steps of preparing terminal information of a terminal to which information is to be transferred, receiving information including a plurality of data items that is transmitted towards a client from the server, storing the information received at the step of receiving information including a plurality of data items, extracting a plurality of data items from the information transmitted towards the client, and transmitting to the client the extracted data items and interface information that realizes at the client an interface to display information in whole and select respective data items corresponding to the extracted data items, based on the extracted data items, receiving from the client transfer request data requesting transfer of a data item selected from the extracted plurality of data items to a terminal, and converting the data item into a data format corresponding to the terminal of a predetermined transfer destination stored in the terminal information storage circuit for transfer to the terminal, based on the transfer request data received at the step of receiving transfer request data.

By the interface realized at a client, the data item to be transferred to a terminal can be selected out from a plurality of data items included in the information transmitted from the server to a client. For example, even in the case where a button appears to select a data item to be transferred to a terminal by the interface realized at the client, data can be selected according to the display of the data item since the entire information including the extracted data items is displayed. The data item selected by the user is converted into a data format that can be browsed by the user's terminal and transferred thereto. Thus, an information transfer method is provided that allows a user to transfer required information such as a web page to a predetermined information communication terminal.

According to a further aspect of the present invention, a machine-readable recording medium is recorded with a program that realizes an information transfer method to transfer to a predetermined terminal information transmitted from a server connected to a network to a client. The information transfer method includes the steps of preparing terminal information of a terminal to which information is to be transferred, receiving information including a plurality of data items that is to be transmitted towards a client from the server, storing the information received at the step of receiving information including a plurality of data items, extracting a plurality of data items from the information transmitted towards the client, and transmitting to the client the extracted data items and interface information that realizes at the client an interface to display information in whole and select respective data items corresponding to the extracted data items, based on the extracted data items, receiving from the client transfer request data requesting transfer a data item selected from the extracted plurality of data items to a terminal, and converting the data item into a data format corresponding to the terminal of a predetermined transfer destination stored in the terminal information storage circuit for transfer to the terminal, based on the transfer request data received at the step of receiving transfer request data.

By the interface realized at a client, the data item to be transferred to a terminal can be selected out from a plurality of data items included in the information transmitted from the server to a client. For example, even in the case where a button appears to select a data item to be transferred to a terminal by the interface realized at the client, data can be selected according to the display of the data item since the entire information including the extracted data items is displayed. The data item selected by the user is converted into a data format that can be browsed by the user's terminal and transferred thereto. Thus, a machine-readable recording medium is provided, recorded with a program realizing an information transfer method that allows a user to transfer required information such as a web page to a predetermined information communication terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows the source code of the web page of FIG. 6.

FIGS. 10 and 11 show first and second sections, respectively, of the source code of the web page of FIG. 9.

FIG. 12 shows a terminal information of an information communication terminal according to a second embodiment of the present invention.

FIGS. 16 and 17 show the first and second sections, respectively, of the source code of the web page of FIGS. 13–15.

DESCRIPTION OF THE PREFERRED EMBODIMENTS

Figure 1:
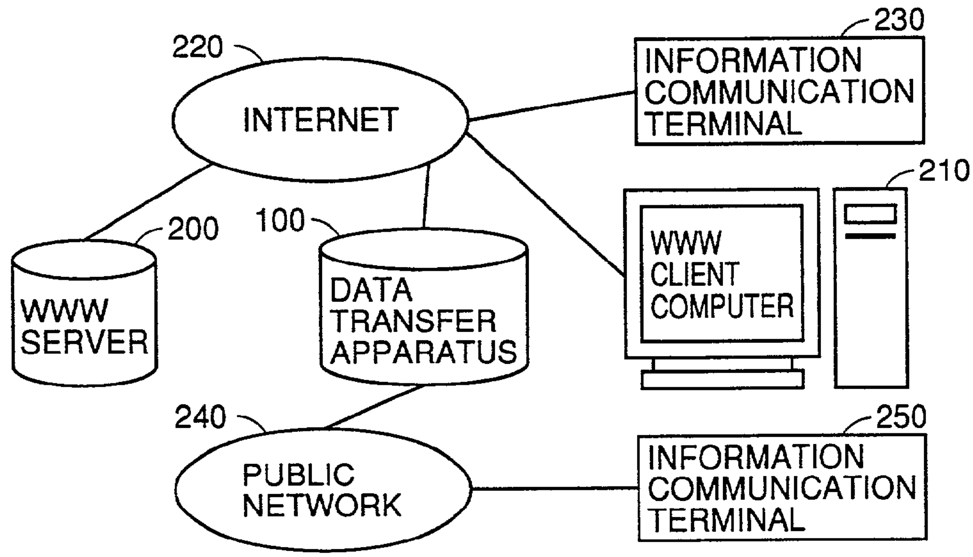
FIG. 1 shows an entire structure including a data transfer apparatus according to a first embodiment of the present invention.

Embodiments of the present invention will be described hereinafter with reference to the drawings. In the following description and drawings, the same reference characters are allotted to the same elements. Labels and functions thereof are identical. Therefore, detailed description thereof will not be repeated where appropriate.

First Embodiment

Referring to FIG. 1, a data transfer apparatus 100 according to a first embodiment of the present invention transfers the data transmitted to a WWW client computer 210 from a WWW server 200 connected to the Internet 220 to an information communication terminal 230 such as a predetermined PDA and to an information communication terminal 250 such as a cellular telephone via the Internet 220 and a public network 240.

Figure 2:
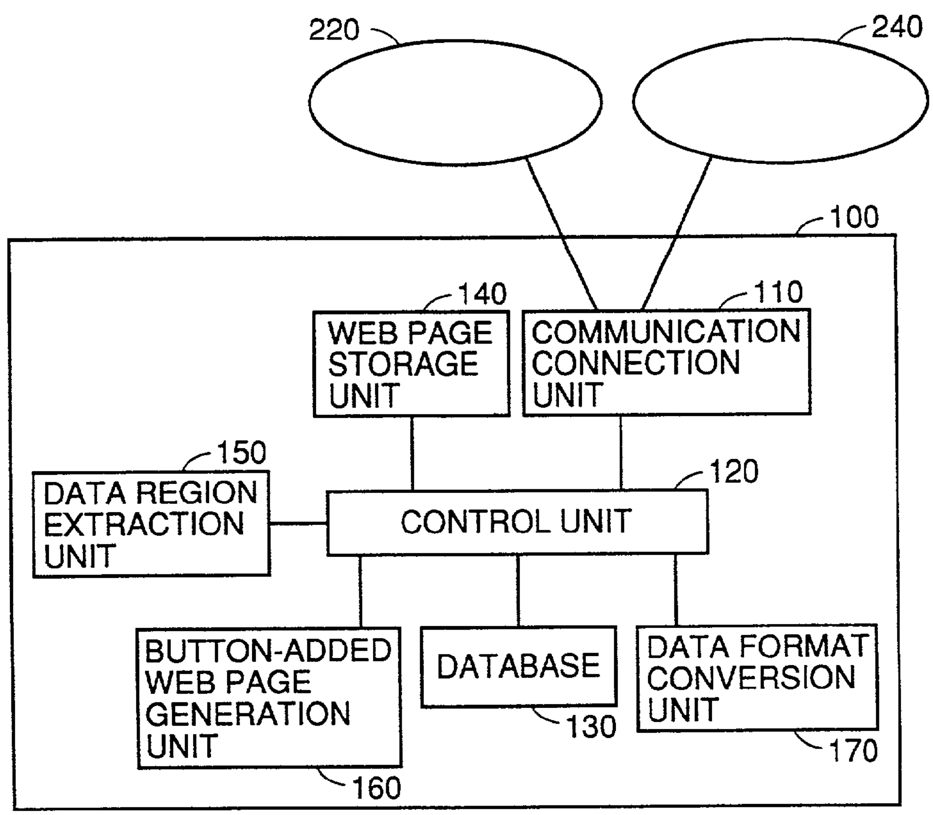
FIG. 2 is a control block diagram of the data transfer apparatus of the first embodiment of the present invention.

Referring to FIG. 2, data transfer apparatus 100 includes a communication connection unit 110 connected to Internet 220 and public network 240 to transfer data between data transfer apparatus 100 and another apparatus (WWW server 200, WWW client computer 210, information communication terminals 230, 250 and the like), a control unit 120 connected to communication connection unit 110 to provide the overall control of data transfer apparatus 100, a database 130 storing terminal information such as of information communication terminals 230 and 250 to which data is to be transferred, a web page storage unit 140 connected to communication connection unit 110 via control unit 120 to store a web page transmitted from WWW server 200 to a WWW client computer 210, a data region extraction unit 150 connected to web page storage unit 140 via control unit 120 to extract a plurality of data regions from the information of the web page transmitted to WWW client computer 210, a button-added web page generation unit 160 connected to data region extraction unit 150 via control unit 120 to generate transmission data added with information to realize a button to select data as an interface, which is to be transmitted to WWW client computer 210 according to the extracted data, and a data format conversion unit 170 connected to communication connection unit 110, database 130 and web page storage unit 140 via control unit 120 to convert data requested to be transferred into a data format corresponding to predetermined information communication terminals 230 and 250 stored in database 130 according to the transfer request data received by communication connection unit 110 from WWW client computer 210.

Control unit 120 includes a CPU (Central Processing Unit) executing a control program to provide the overall control of data transfer apparatus 100, a ROM (Read Only Memory) or a hard disk storing the program to be executed by the CPU and various data, and a RAM (Random Access Memory) storing intermediate data of the process executed by the CPU.

Figures 3, 4:
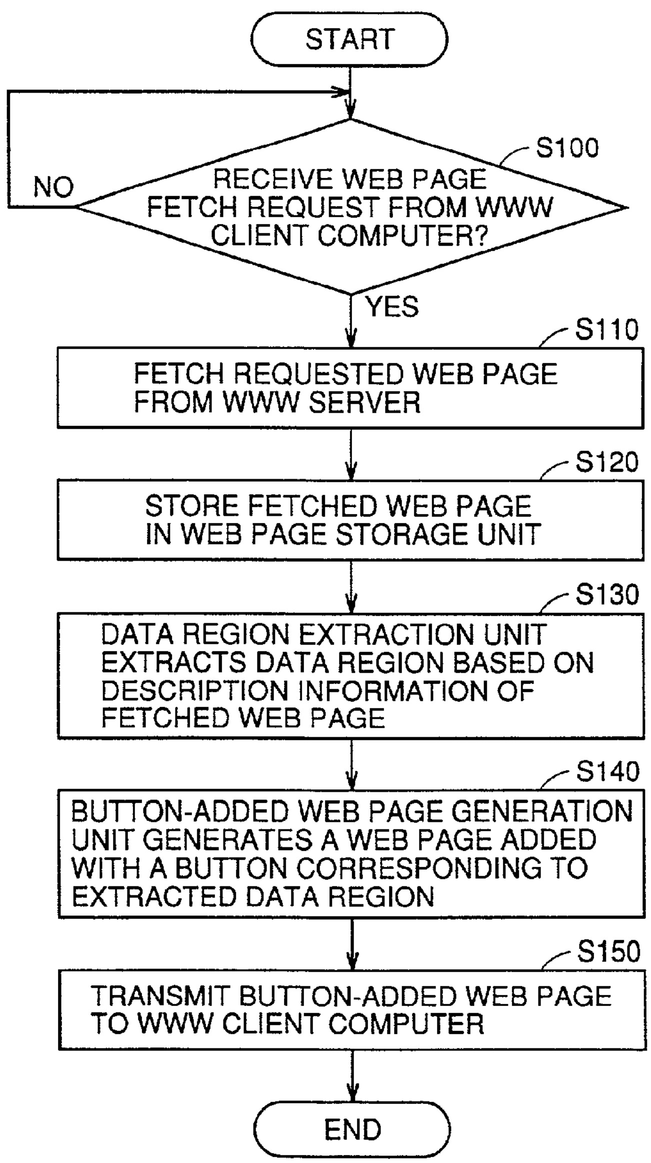
FIG. 3 shows terminal information of an information communication terminal of the first embodiment of the present invention.
FIG. 4 is a flow chart of the control procedure of a transmission data generation process in the data transfer apparatus of the first embodiment of the present invention.

Information of information communication terminals 230 and 250 are stored for each user requesting data transfer in database 130. Referring to FIG. 3, the information includes a transmission information format (e-mail, FAX, cellular telephone, and the like) for each user, a transmission destination (e-mail address, telephone number, and the like), and a connection destination (the Internet, public network, and the like). Furthermore, the data format that can be displayed at the information communication terminal can be stored.

Communication connection unit 110 receives data of a web page including a plurality of data from WWW server 200, and transmits the data of the received web page to WWW client computer 210. Communication connection unit 110 transmits the button-added web page generated by button-added web page generation unit 160 to WWW client computer 210. Communication connection unit 110 receives from WWW client computer 210 transfer request data requesting transfer of data selected from the extracted plurality of data to information communication terminals 230 and 250. Communication connection unit 110 transfers the data converted into a predetermined data format by data format conversion unit 170 to information communication terminals 230 and 250.

The web page is a home page or the like represented using description languages such as HTML (Hypertext Markup Language) and XML (Extensible Markup Language). These home pages can be browsed by a browser executed by WWW client computer 210. Data such as in a short message format is transmitted from data transfer apparatus 100 to a cellular phone via public network 240.

The relationship between a user and WWW client computer 210 shown in FIG. 3 is identified as set forth in the following in data transfer apparatus 100. WWW client computer 210 transmits information of an information communication terminal for registration to data transfer apparatus 100 via Internet 220. The user identification information is transmitted from data transfer apparatus 100 to WWW client computer 210. The transmitted user identification information is stored at WWW client computer 210. WWW client computer 210 transmits the user identification information to data transfer apparatus 100 at the time of transmitting web page fetch information and data transfer request information. Data transfer apparatus 100 receiving the user identification information can identify the user from the user identification information at the time of registration of the information of the information communication terminal.

In addition to data related to the information communication terminal of the transfer destination shown in FIG. 3, various advertisement data, name data of the transmitter, and the like that are to be added to the data transferred through data transfer apparatus 100 are stored in database 130. These data are added to the data to be transferred after conversion of the data format at data format conversion unit 170. Advertisement data includes, for example, advertisement information of the enterprise that supplies the service of data transfer apparatus 100 or advertisement information collected by that enterprise.

Web pages such as home pages described in HTML or XML are stored in web page storage unit 140. Data region extraction unit 150 searches for a particular tag from the source code described in, for example, HTML according to the data stored in web page storage unit 140 to extract the data region and identify the format of the data.

Button-added web page generation unit 160 generates data having a data select button added to at least either the inner side or neighborhood of the data in the web page extracted by data region extraction unit 150. The following description corresponds to those having a data select button displayed in respective regions of data in the web page extracted by data region extraction unit 150.

Data format conversion unit 170 converts the format of the extracted data according to the format of respective data included in the web page extracted by data region extraction unit 150 and the transmission information format of the information communication terminal of the destination user. In the case where display at the information communication terminal of the destination side is disabled even if the data specified for transfer is data-converted, control unit 120 can transmit to WWW client computer 210 an error message, or add data representing "transfer failure data present" to the data to be transmitted for transfer to the information communication terminal of the destination side.

The program executed by data transfer apparatus 100 relates to a web page transmission process, as shown in FIG. 4, and has a control structure set forth below. It is assumed in the following that the data transfer apparatus of the present embodiment is implemented by an apparatus such as a proxy server that relays data between WWW server 200 and WWW client computer 210.

At step 100 (step abbreviated as "S" hereinafter), control unit 120 determines whether web page fetch request information (such as web page specify information) is received from WWW client computer 210 via communication connection unit 110. This determination is made based on whether predetermined data is received or not from WWW client computer 210 via communication connection unit 110. When web page fetch request information is received (YES at S100), control proceeds to S110. If web page fetch request information is not received (NO at S100), control returns to S100 to wait for reception of web page fetch request information.

At S110, control unit 120 fetches from WWW server 200 the web page requested from WWW client computer 210 via communication connection unit 110. At S120, control unit 120 stores the fetched web page data in web page storage unit 140.

Figure 6:
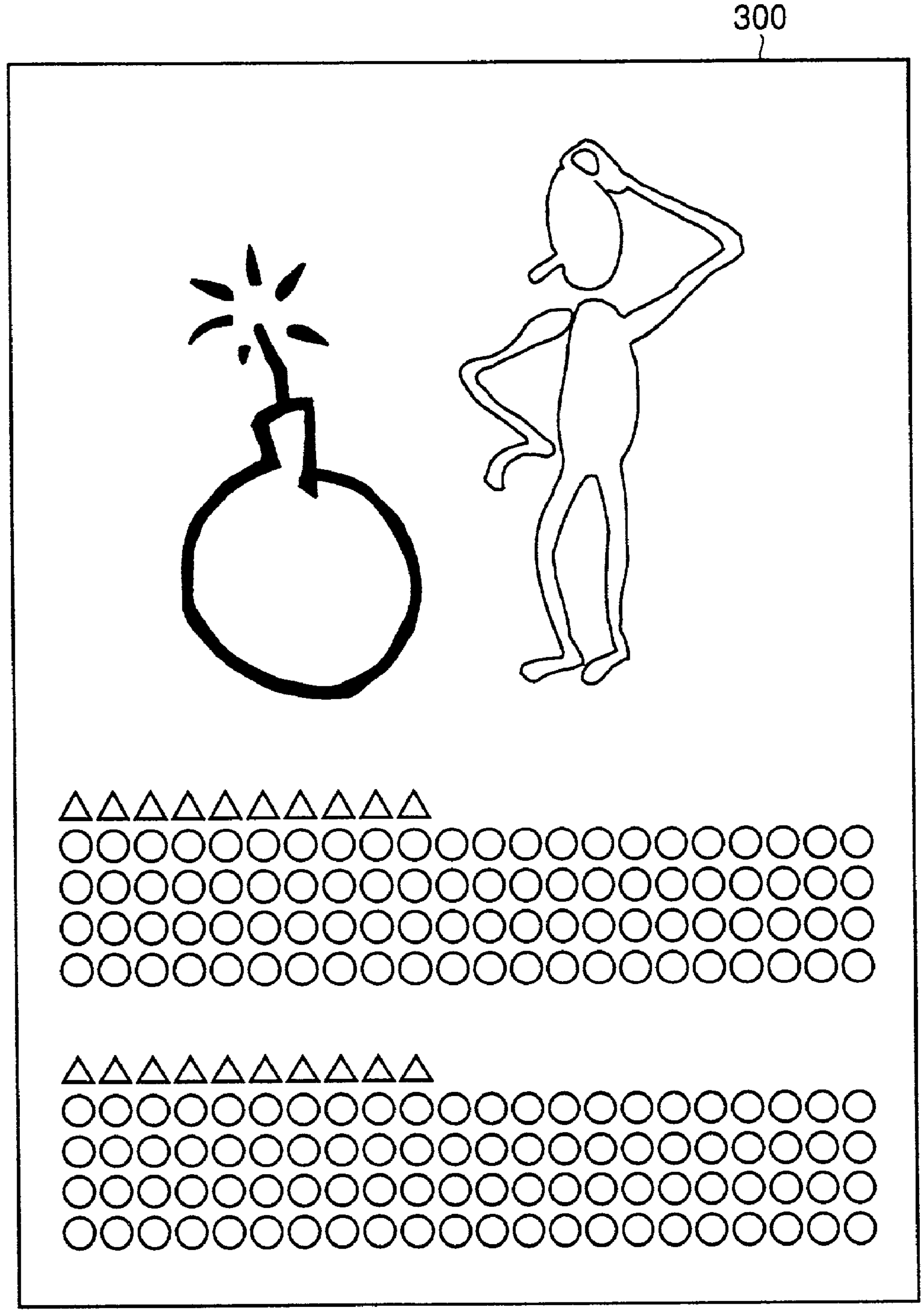
FIG. 6 is a web page received from a server by the data transfer apparatus of the first embodiment of the present invention.
Figure 7:
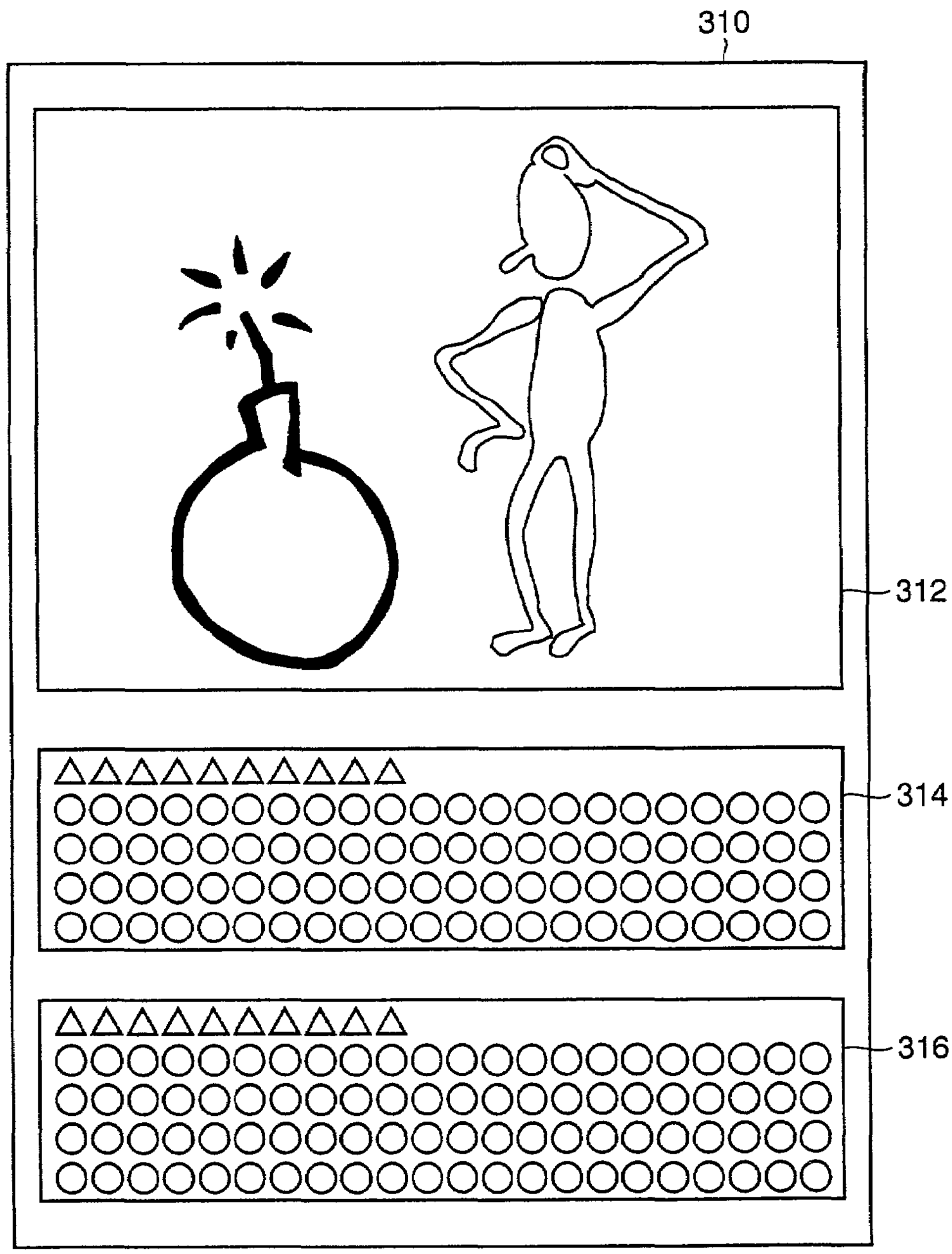
FIG. 7 shows the result of extracting data from the web page of FIG. 6.

At S130, data region extraction unit 150 extracts a data region included in the web page, based on the data (data described in HTML) of the web page stored in web page storage unit 140. It is assumed that the web page requested by WWW client computer 210 and obtained from WWW server 200 is a web page 300 as shown in FIG. 6. Upon execution of the data extract process by data region extraction unit 150 on such a web page at S130, data regions 312, 314 and 316 shown in FIG. 7 are extracted. The data extraction process of S130 will be described based upon a source code 320 of web page 300 shown in FIG. 8.

Referring to FIG. 8, source code 320 described in HTML represents the structure of the web page, the location of the file with an image or the like, the link destination, and the like using a tag constituted by a reserved word sandwiched by "<" and ">". By searching for this tag, data is extracted and the data format is identified. In the case of an IMG tag, for example, "<IMG" and ">" are searched for. The data starting from the found "<IMG" location up to the position of the first ">" is identified as image data. In the case of a TD tag, "<TD>" and "</TD>" are searched for. The data starting from the found "<TD>" position up to the position of the first "</TD>" is identified as the data representing each item in a table. By searching for a tag, data extraction and data format identification are performed. Data region 312, data region 314 and data region 316 of FIG. 7 correspond to source code region 322, source code region 324, and source code region 326, respectively, of FIG. 8.

In the case where respective data select buttons to select these data regions 312, 314 and 316 are to be displayed within each data region, a source code described with the program to display the button, the image data of the button, and the like is to be inserted in the aforementioned source code to generate data representing a web page added with a data select button. In the process of S130, the position to insert the source code described with a program and the like to display the data select button inside each data region is determined according to the extracted data.

Figure 9:
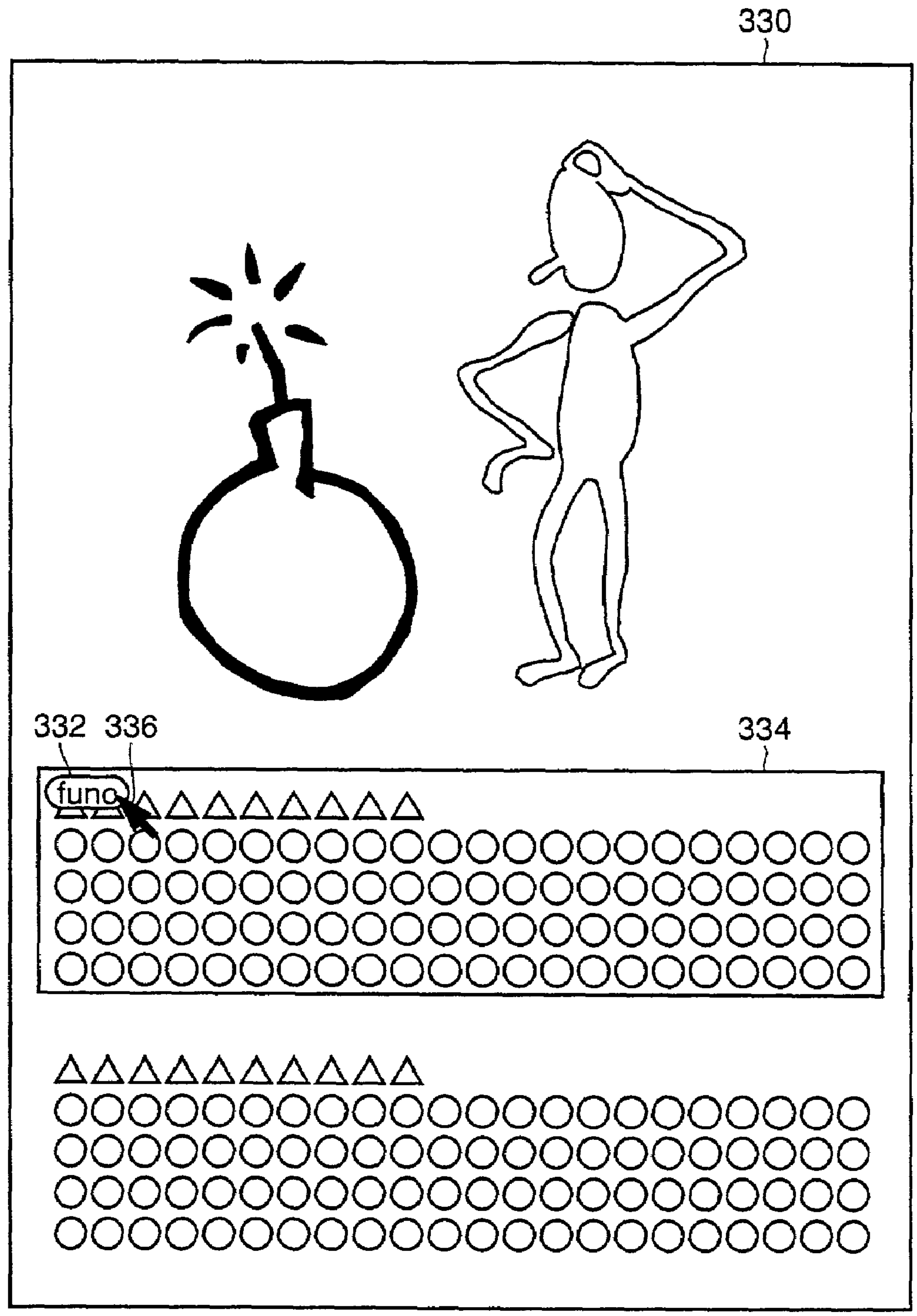
FIG. 9 shows the web page to be transmitted to a client by the data transfer apparatus according to the first embodiment of the present invention.

At S140, button-added web page generation unit 160 generates a web page added with a data select button that can designate whether to transfer the relevant data to the information communication terminal corresponding to each of data regions 312, 314 and 316 included in web page 300 extracted at S130. When the web page fetched from WWW server 200 is as shown in FIG. 6, the button-added web page generated by button-added web page generation unit 160 is represented in FIG. 9. More specifically, a web page 330 added with a data select button 332 to select the data of data region 334 is provided only in the case where mouse pointer 336 points to a portion of data region 334. In the case where mouse pointer 336 points to a portion of data region 334 or in the case where mouse pointer 336 points to data select button 332, the background color of data region 334 is altered to a predetermined color (a color differing from the background color of the other data regions). Button-added web page 330 is displayed, not at data transfer apparatus 100, but at WWW client computer 210.

The button adding process carried out at S140 will be described based on the source code of web page 330 shown in FIGS. 10 and 11. The source code of FIG. 10 is a version of the source code of FIG. 8 into which a source code describing a program to display or erase data select button 332 is inserted. The source code of FIG. 11 is a version of the source code of FIG. 8 to which is inserted the source code described with a tag to display data select button 332, a tag to execute a function to display data select button 332 corresponding to data region 334 when mouse pointer 336 points to a portion of data region 334, and a tag to execute a function to not display data select button 332 when mouse pointer 336 does not point to a portion of data region 334.

The button adding process is carried out similarly for regions other than data region 334. Source code regions 342–325 of FIG. 10 are inserted into the region sandwiched by "<HEAD>" and "</HEAD>" of FIG. 8. Source code regions 362–372 of FIG. 11 are inserted into the region sandwiched between "<BODY>" and "</BODY>" of FIG. 8. The position where these source codes are inserted is determined so as not to hinder the operation and the like of the program described by these source codes. The contents of these source code regions will be described here.

Referring to FIG. 10, source code region 342 includes the function to display a specified button. Source code region 344 includes the function to not display the specified button. Source code region 346 includes the function to alter the background color of the specified data region to a predetermined color. Source code region 348 includes the function to return the background color of the specified data region to its former color on the web page. Source code region 350 includes the function executed when the button displayed on the web page is clicked. Source code region 352 includes data indicating the attribute of the display button.

Referring to FIG. 11, source code region 362 includes the function to display data select button 332 corresponding to data regions 334 when mouse pointer 336 points to a portion of data region 334. Accordingly, a data select button corresponding to data region 334 can be displayed when mouse pointer 336 points to a portion of data region 334. Source code region 362 includes the function to not display data select button 332 corresponding to data region 334 when mouse pointer 336 does not point to a portion of data region 334. Thus, data select button 332 corresponding to data region 334 can be set as non-display when mouse pointer 336 does not point to a portion of data region 334.

Source code region 364 defines the image and display of data select button 332 corresponding to data region 334. Source code region 364 defines the function to alter the background color of the data corresponding to data region 334. Thus, when mouse pointer 336 points to a portion of data region 334, data select button 332 is displayed in data region 334. When mouse pointer 336 points to data select button 332, the background color of that data region 334 changes.

Source code region 362 and source code region 366 are arranged inside the tags of "<TD>" and "</TD>" which are tags indicating data region 314. Source code region 364 sandwiched between "<SPAN>" and "</SPAN>" is disposed between source code region 362 and source code region 366. Accordingly, data select button 332 corresponding to data region 334 can be displayed in data region 334. Also, the change of the background color can be directed to data region 334.

Source codes 368, 370 and 372 correspond to data region 316. Source codes 368, 370 and 372 are similar to source codes 362, 364 and 366, respectively, except for the id (identification) indicating the button and the id indicating the data region. Therefore, detailed description thereof will not be repeated where appropriate.

Referring to FIG. 4 again, control unit 120 transmits a button-added web page at S150 towards WWW client computer 210 that has requested web page fetch at S100.

Figure 5:
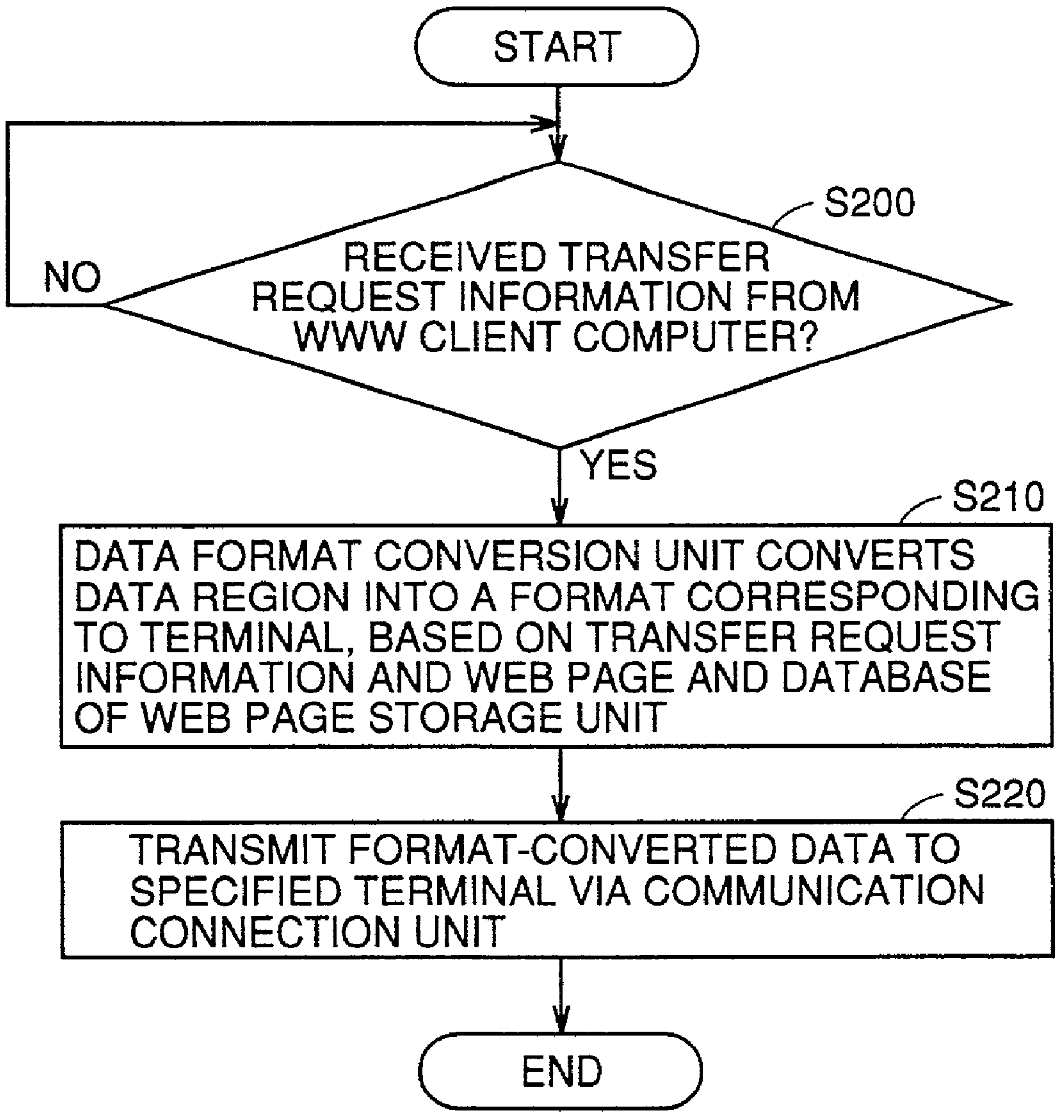
FIG. 5 is a flow chart of a control procedure of a data transfer process in the data transfer apparatus of the first embodiment of the present invention.

Referring to FIG. 5, the program executed by data transfer apparatus 100 relates to a data transfer process, and has a control structure set forth below.

At S200, control unit 120 determines whether data transfer request information is received from WWW client computer 210. Here, the user identification information is transmitted together from WWW client computer 210. This determination is based on whether data transfer request information is received or not from WWW client computer 210 via communication connection unit 110. When data transfer request information is received (YES at S200), the control proceeds to S210. If data transfer request information is not received (NO at S200), control returns to S200 to wait for reception of data transfer request information. The data transfer request information includes a flag (set status) indicating the transfer request of data region 334 to user's information communication terminals 230 and 250 that is generated by depression of data select button 332 shown in FIG. 9.

At S210, data format conversion unit 170 converts the data of the selected region into a data format corresponding to the relevant information communication terminal based on the data transfer request information received at S200, the information of the information communication terminal of the transfer destination stored in database 130 and the information of the web page stored in web page storage unit 140. For example, referring to FIGS. 7 and 8, when transfer of data region 312 which is in the jpeg (joint photographic experts group) format is requested and the format that can be displayed as to image data at the receiving information communication terminal is the gif (graphics interchange format), data format conversion unit 170 converts the data into gif from the jpeg format.

At S220, control unit 120 transmits the format-converted data to a predetermined transfer destination via communication connection unit 110.

The operation of data transfer apparatus 100 according to the above structure and flow charts will be described hereinafter.

[Web Page Transmission Process]

Upon reception of a request of web page fetching from WWW client computer 210 (YES at S100), data transfer apparatus 100 obtains data of a specified web page from WWW server 200. The obtained web page data is stored in web page storage unit 140 (S120), from which a data region included in the web page is extracted (S130). Referring to FIG. 7, the data regions extracted here are data regions 312, 314 and 316. Referring to FIG. 8, source codes corresponding to these data regions are source code regions 322, 324 and 326.

Button-added web page data that allows the display of a button corresponding to each of the extracted data regions at WWW client computer 210 is generated (S140). The generated button-added web page data is transmitted to WWW client computer 210 (S150).

[Data Transfer Process]

Based on the button-added web page data transmitted to WWW client computer 210, a button corresponding to respective data is displayed at WWW client computer 210. At the same time, the entire transfer data is displayed at WWW client computer 210. By the depression of any of the displayed buttons, the data requested to be displayed is selected (S150). Here, if mouse pointer 336 points to a portion of data region 334, data select button 332 is displayed at WWW client computer 210, as shown in FIG. 9. When mouse pointer 336 points to data select button 332, the background color of data region 334 changes. If mouse pointer 336 does not point to data select button 332, the background color of data region 334 returns to its former color. Data select button 332 is not displayed if mouse pointer 336 does not point to a portion of data region 334. Display of data select button 332 and change of the background color of data region 334 can both be effected by pointing to a portion of data region 334.

Thus, the user can view the entire data region corresponding to the transfer request, and then designate a data region that is to be transferred with mouse pointer 336 to display data select button 332, and click the relevant data select button with mouse pointer 336.

WWW client computer 210 transmits data transfer request information including the data that is requested to be transmitted and data of the transfer destination to data transfer apparatus 100.

Upon receiving the data transfer request information (YES at S200), data transfer apparatus 100 converts the data in the web page into a predetermined data format according to the data format of the data in the selected region and the information of the communication terminal of the transfer destination (displayable data format and the like) (S210). The format-converted data is transferred to the information communication terminal specified by WWW client computer 210 via Internet 220 and public network 240. The transferred data can be browsed at information communication terminals 230 and 250.

Thus, the data transfer apparatus transmits button-added web data to the WWW client computer. The button-added web data has respective buttons corresponding to a plurality of data in the web page added to the web page that is requested for browsing by the WWW client computer. As a result, the data transfer apparatus converts the data selected using a corresponding added button at the WWW client computer into a predetermined data format for transfer to a predetermined information communication terminal.

Accordingly, the data transfer apparatus of the present embodiment allows the user to easily transfer required information such as a web page to a predetermined information communication terminal.

A transfer temporary suppression flag can be stored for each user in database 130, which is set and reset by WWW client computer 210. Accordingly, a user that does not desire transfer to an information communication terminal temporarily can designate temporary suppression of transfer to dispense with the generation process of a select button or the like that will be described afterwards.

The function of data transfer apparatus 100 can be incorporated into a proxy server or the like connected to Internet 220. Accordingly, a data transfer apparatus according to the present embodiment can be realized by that proxy server. In this case, communication connection unit 110 receives, in addition to the aforementioned function, web page fetch request information, for example, URL (Uniform Resource Locators) transmitted from WWW client computer 210 to WWW server 200.

The source code region corresponding to data region 334 is not limited to those described above. What is required of the source code region is the capability of detecting the position pointed out by the mouse, specification of a function to be executed when the position is detected (data selected button display, background color change), detection of clicking the mouse pointer in data region 334, and specification of a function for execution when it is sensed.

The present invention is not limited to the embodiment in which a corresponding data transfer button is displayed in the data region of the data to be transferred. For example, the corresponding data transfer button may be displayed in the proximity of the data region. In this case, a source code described with a program that causes display of a predetermined button at a position in the proximity of the data region is inserted into the source code of FIG. 8.

It is to be noted that the displayed status of the data select button, once displayed by the mouse pointer designating a portion of the data region, is maintained until a portion of that data region is designated again. Accordingly, even if the mouse pointer points to a portion of a data display region, and then points to a region outside that data region, the data select button appearing inside or in the proximity of the data region is not rendered non-display to allow the data select button to be clicked.

Second Embodiment

The data transfer apparatus of the present embodiment stores transfer destination data corresponding to a plurality of information communication terminals for each user. The data transfer apparatus transmits to WWW client computer 210 a plurality of data extracted from a web page, information to realize at WWW client computer 210 a data select button to select data that is to be transferred out from the plurality of data, and information realizing a transfer destination select button to select the destination to which data is to be transferred at WWW client computer 210. The data transfer apparatus transfers the data selected by WWW client computer 210 to the selected transfer destination to be stored.

The data transfer apparatus of the present embodiment differs from that of the previous embodiment in the contents of data stored in database 130 and the contents of the process carried out at S140 executed by a button-added web page generation unit differing from button-added web page generation unit 160. The remaining hardware structure and the flow charts are identical to those of the first embodiment. Therefore, detailed description thereof will not be repeated where appropriate.

Referring to FIG. 12, data corresponding to a plurality of information communication terminals are stored for each user in database 130. This allows the required transfer destination to be selected from a plurality of transfer destinations and transfer the selected data to a predetermined transfer destination. The data shown in FIG. 12 can be registered, modified and deleted by WWW client computer 210 via Internet 220, as in the first embodiment.

At S140, a button-added web page generation unit generates a web page added with a data select button corresponding to each of data regions 312, 314 and 316 included in web page 300 extracted at S130 to designate whether to transfer the relevant data to an information communication terminal or not and a transfer destination select button that allows selection of a transfer destination for the selected data. When the web page obtained from WWW server 200 is as shown in FIG. 6, the button-added web page generated by the button-added web page generation unit is exemplified in FIG. 13. More specifically, this web page 380 includes an additional transfer destination select button 382 that allows input of a transfer destination of the data selected by the data select button. By this transfer destination select button 382, transfer in either the mail format or fax format can be selected by mouse pointer 384.

Figure 14:
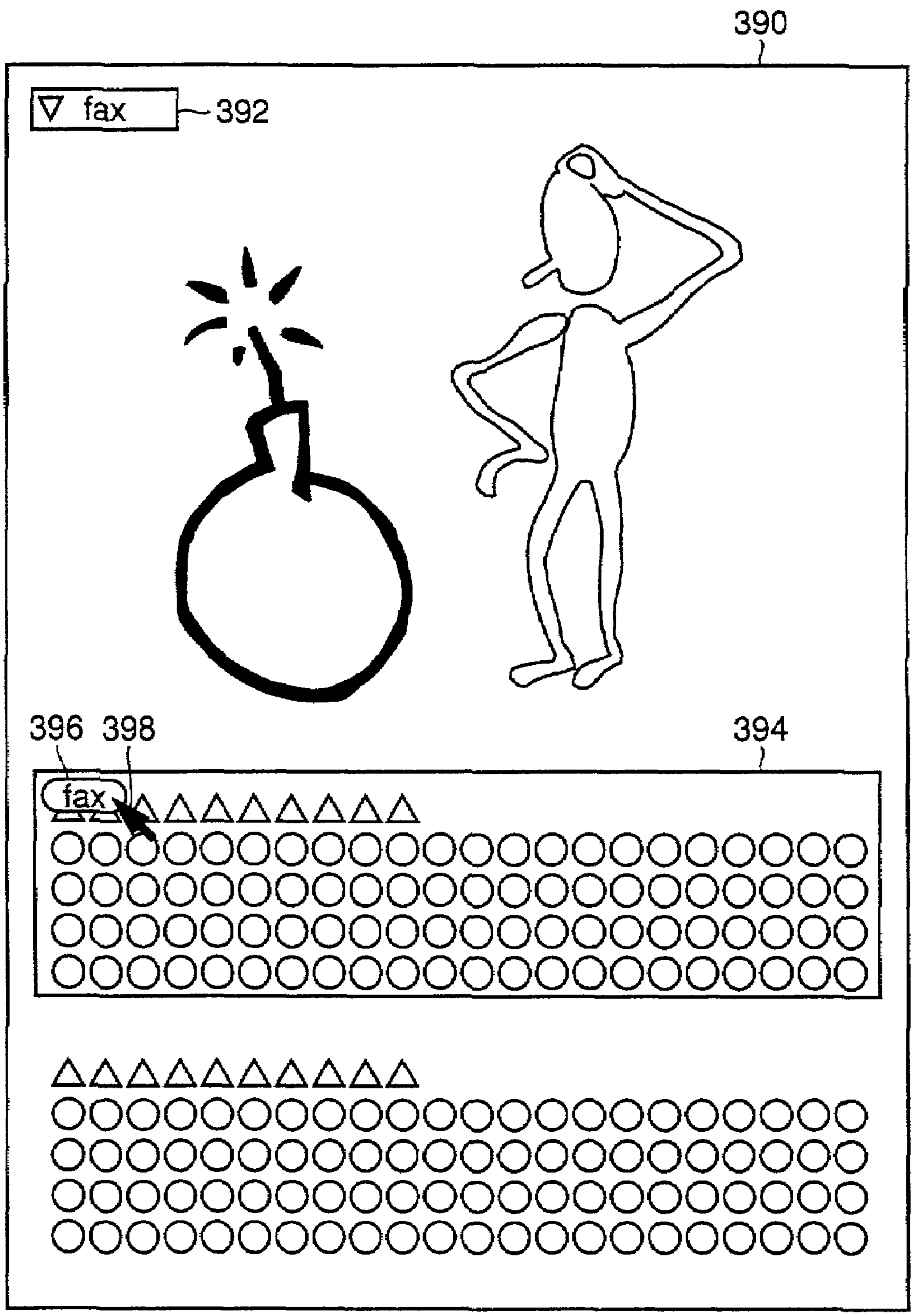
FIGS. 14 and 15 show respective web pages with the display of a data select button that is to be transmitted to a client by the data transfer apparatus of the second embodiment of the present invention.

FIG. 14 shows a web page 390 corresponding to selection of a transfer in the fax format by transfer destination select button 382. Web page 390 includes a data select button 396 to select data of data region 394. Data select button 396 is displayed only when mouse pointer 398 points to a portion of data region 394. The background color of data region 394 changes when mouse pointer 398 points to a portion of data region 394 or data select button 396.

Figure 15:
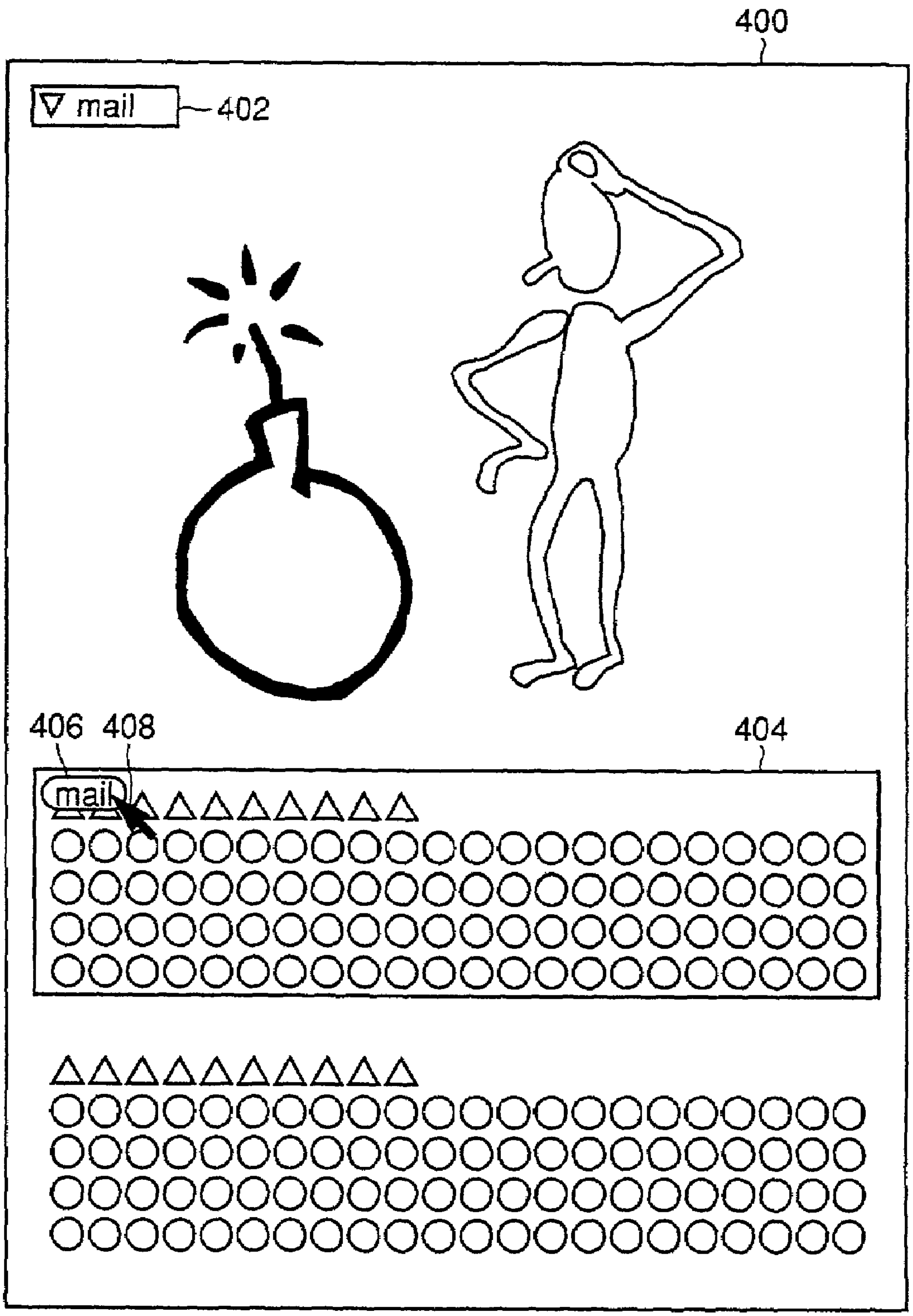

FIG. 15 shows a web page 400 corresponding to the case where transfer in a mail format is selected through transfer destination select button 382. Web page 400 includes a data select button 406 to select data of data region 404, displayed only when mouse pointer 408 points to a portion of data region 404. The background color of data region 404 changes when mouse pointer 408 points to a portion of data region 404 or data select button 406. Button-added web pages 380, 390 and 400 are displayed, not at data transfer apparatus 100, but at WWW client computer 210.

The button adding process carried out at S140 will be described with reference to the source codes of web pages 380–400 shown in FIGS. 16 and 17. The source code of FIG. 16 includes a program to display or not display data select button 406 in the source code of FIG. 8. The source code of FIG. 17 is a version of the source code of FIG. 8, inserted with source codes and the like described with a tag to display data select button 406 and the like, a tag to execute the function of displaying a corresponding data select button 406 and the like when mouse pointer 408 designates a portion of the corresponding data region, and a tag to execute the function to not display data select button 406 and the like when mouse pointer 408 does not designate a portion of the corresponding data region.

The button adding process is similarly carried out for regions other than the foregoing data regions 394 and 404. More specifically, source code regions 502–522 of FIG. 16 are inserted into the region sandwiched by "<HEAD>" and "</HEAD>" of FIG. 8. Source code regions 532–544 of FIG. 17 are inserted into the region sandwiched by "<BODY>" and "</BODY>" of FIG. 8. The position where these source codes are inserted is determined so as not to hinder the operation and the like of the program described by the source codes. The contents of these source code region will be described hereinafter.

Referring to FIG. 16, source code region 502 includes the function to display a specified button. Source code region 504 includes a function to fetch the selected contents of a transfer destination select button. Source code region 506 includes a function to alter the button image according to the selected contents obtained at source code region 504. Source code region 508 includes the function to designate display of a button. Source code region 510 includes the function to change the displayed data select button to a non-displayed state. Source code region 512 includes the function to alter the background color of the specified data region to a predetermined color. Source code region 514 includes the function to return the background color of the specified data region to its former color on the web page. Source code region 516 includes the function for execution when the button displayed on the web page is clicked. Source code region 518 includes the function to fetch the selected contents of the transfer destination select button. Source code region 520 defines the function of fetching data of a specified data region and the function provided when a data select button is clicked according to the selected contents. This function differs depending upon the type of the transfer destination of data. Source code region 522 includes data indicating the attribute of the display button.

Referring to FIG. 17, source code region 532 includes the function to specify display of the transfer destination select button. Source code region 534 includes the function to display the data select button corresponding to respective data regions when the mouse pointer points to a portion in data region 394 or 404. Accordingly, a data select button corresponding to respective data regions can be displayed if the mouse pointer points to a portion of data region 394 or 404. Source code region 534 includes the function to not display the data select button corresponding to respective data regions when the mouse pointer does not point to a portion of data region 394 or 404. Thus, a corresponding data select button can be rendered to a non-display state when the mouse pointer does not point to a portion of data region 394 or 404.

Source code region 536 defines the image and display of a corresponding data select button for data regions 394 or 404. Source code region 536 defines the function to change the background color of data corresponding to data region 394 or 404. When the mouse pointer points to a portion of data region 394 or 404, a corresponding data select button is displayed in data region 394 or 404. When the mouse pointer points to the relevant data select button, the background color of data region 304 or 404 changes.

Source code regions 534 and 538 are arranged right inside the region sandwiched between "<TD>" and "</TD>" which is the tag indicating data region 314. Source code region 536 is disposed in the region sandwiched by "<SPAN>" and "</SPAN>" between source code regions 534 and 538. Accordingly, a data select button corresponding to data region 394 or 404 can be displayed in data region 394 or 404. The change of the background color can be directed to data region 394 or 404.

Source codes 540, 542 and 544 correspond to data region 316. Source codes 540, 542 and 544 are similar to source codes 534, 536 and 538, respectively, except for the id indicating a relevant button and the id indicating a relevant data region. Therefore, detailed description will not be repeated where appropriate.

Figure 13:
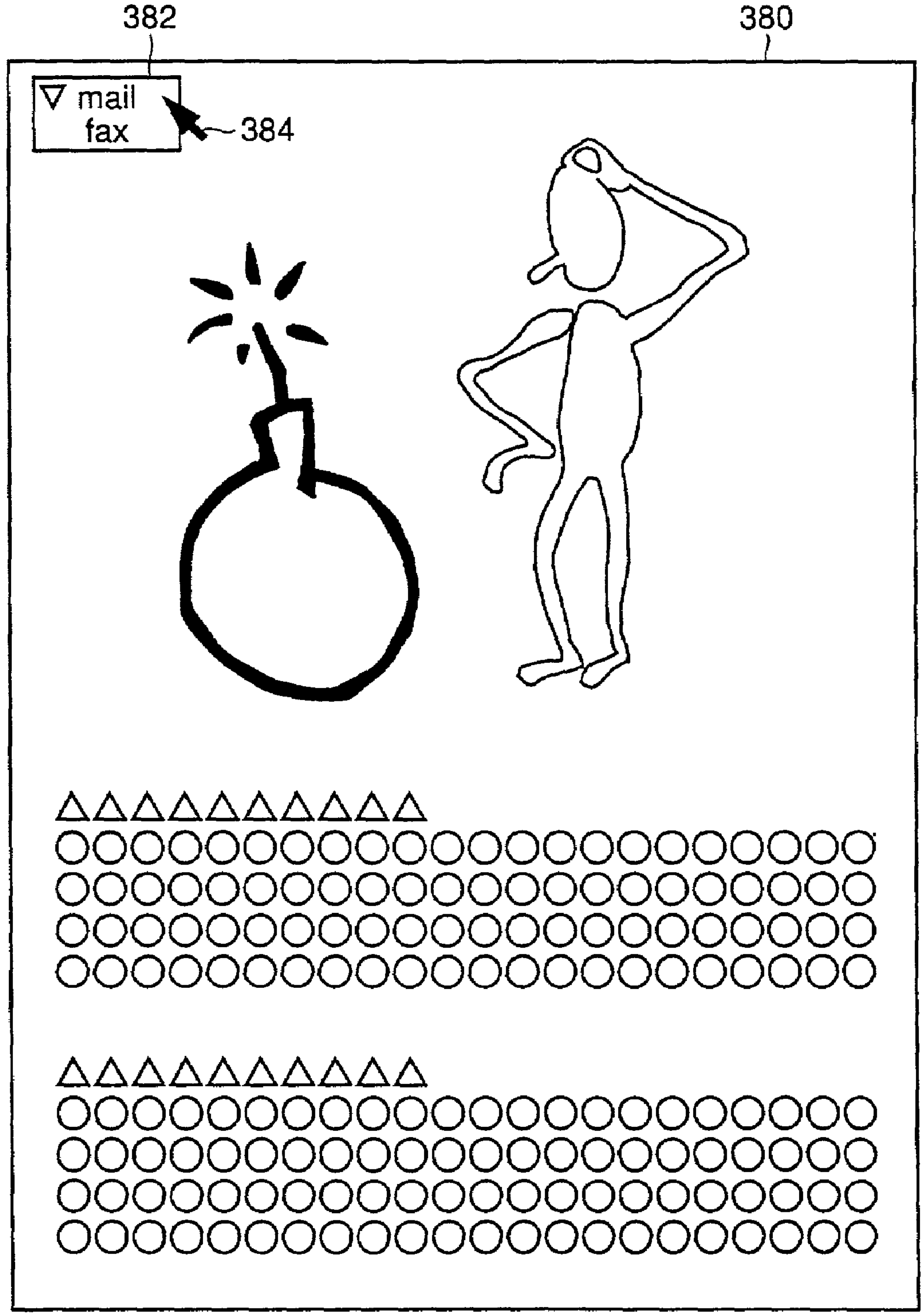
FIG. 13 shows a web page with a display of a transfer destination select button that is to be transmitted to a client by the data transfer apparatus of the second embodiment of the present invention.

The operation of the data transfer apparatus when a button-added web page is generated according to the foregoing process in S140 will be described. As shown in FIG. 13, a transfer destination select button 382 is displayed in the screen of WWW client computer 210. The transfer destination is selected through transfer destination select button 382 using mouse pointer 384 at WWW client computer 210.

Data select button 396 is displayed as shown in FIG. 14, when mouse pointer 398 points to a portion of data region 394 after selection of a fax transfer. When data select button 396 is pointed with mouse pointer 398, the background color of data region 394 changes. The background color of data region 394 returns to its former color if mouse pointer 398 does not point to data select button 396. Data select button 396 is rendered to a non-display state if mouse pointer 398 does not point to a portion of data region 394.

If mouse pointer 408 points to a portion of data region 404 after a mail transfer is selected, data select button 406 is displayed as shown in FIG. 15. When data select button 406 is pointed out with mouse pointer 408, the background color of data region 404 changes. The background color of data region 404 returns to its former color unless mouse pointer 408 does not designate data select button 406. Data select button 406 is rendered to a non-display state unless mouse pointer 408 points to a portion in data region 404.

Thus, the data select button of a data region requesting transfer is clicked with mouse pointer 398 or 408.

Information such as a web page required by the user can be transferred to an information communication terminal that is specified in the data transfer apparatus of the present embodiment.

The source code regions for data region 394 or 404 are not limited to those described above. Any source code region is applicable as long as detection of the position of mouse pointer, specification of a function to be executed (data select button display, background color change) when the position is sensed, detection of clicking a mouse pointer at a portion of data region 394 or 404, and specification of a function to be executed when mouse click is sensed can be effected.

Display of data select button 396 and change of the background color of data region 394 can be effected when mouse pointer 398 points to a portion of data region 394. Furthermore, display of data select button 406 and change of the background color of data region 404 can be effected when mouse pointer 408 points to a portion in data region 404.

Third Embodiment

The third embodiment of the present invention corresponds to a partial modification of the process of the second embodiment. Data transfer apparatus 100 of the present embodiment differs from that of the previous second embodiment in the structure of S140. The remaining hardware structure and flow charts are similar to those of the second embodiment. Therefore, detailed description will not be repeated where appropriate.

Figure 18:
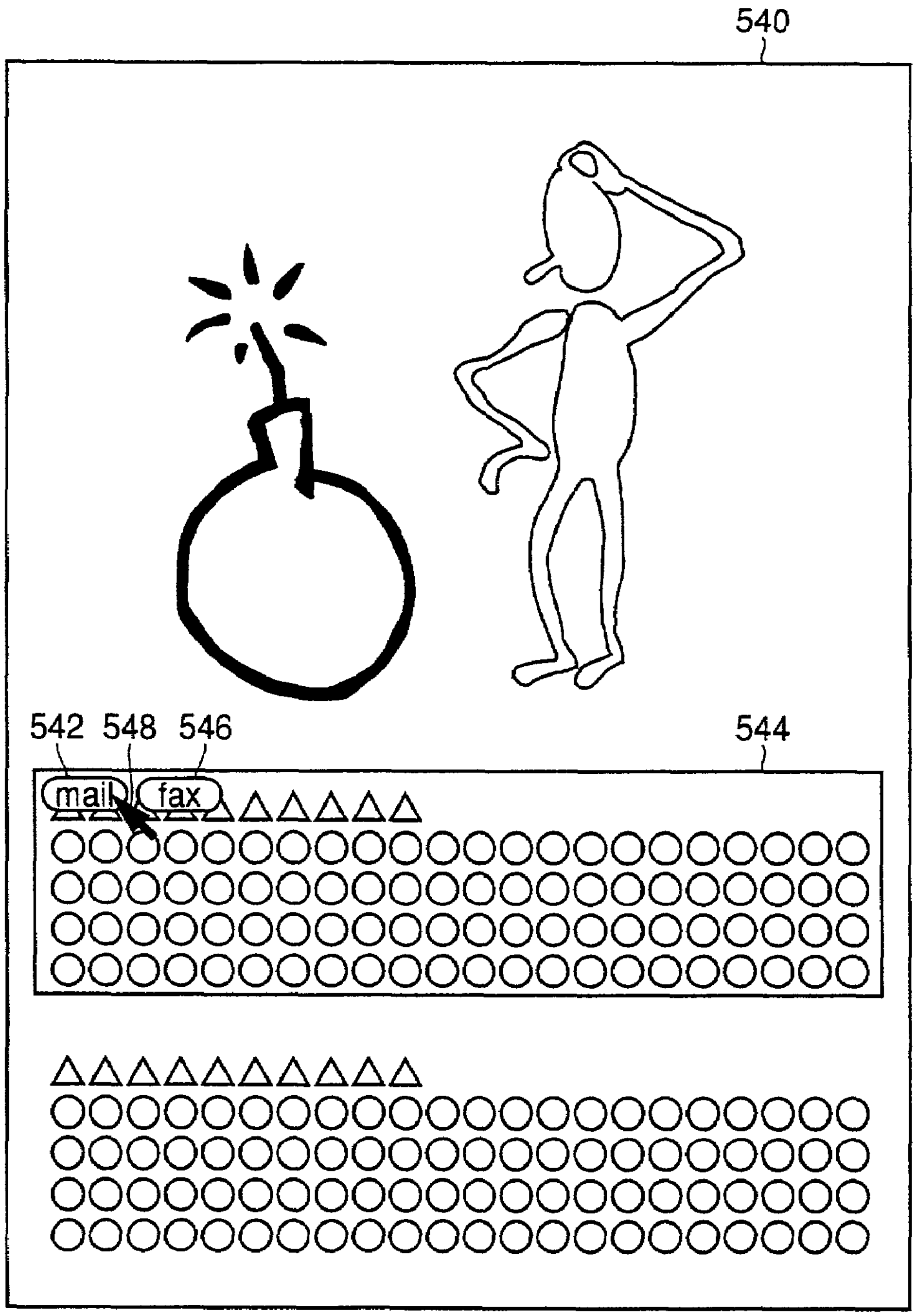
FIG. 18 shows a web page with the display of a data select button that is to be transmitted to a client by the data transfer apparatus according to a third embodiment of the present invention.

At S140, a web page 540 is generated, as displayed at WWW client computer 210 shown in FIG. 18. More specifically, a web page is generated added with respective data select buttons, corresponding to data region 312, 314 and 316 in web page 300 extracted at S130, to allow designation of whether to transfer the data in a mail format and whether to transfer the data in a fax format.

When the web page obtained from WWW server 200 is as shown in FIG. 6, a web page generated by the button-added web page generation unit is exemplified in FIG. 18. More specifically, a web page 540 further includes a data transfer button 542 designating transfer request of data region 544 in a mail format, and a data transfer button 546 designating transfer request of the data in a fax format. By clicking data transfer button 542 with a mouse pointer, the data of data region 544 is transferred in a mail format. When data transfer button 546 is clicked with a mouse pointer, the data of data region 544 is transferred in a fax format. These data transfer buttons 542 and 546 are displayed only when the mouse pointer points to a portion of data region 544. When the mouse pointer points to a portion of data region 544 or points to data transfer buttons 542 and 546, the background color of data region 544 changes.

Thus, information required by the user such as a web page can be transferred to a specified information communication terminal according to the data transfer apparatus of the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information transfer method transferring, to a terminal, information transmitted from a server connected to a network to a client, said information transfer method comprising the steps of:

preparing terminal information for said terminal to which said information is to be transferred, including a destination address for use in transferring said information, receiving information including a plurality of data items, transmitted from said server towards said client, storing said information received at said step of receiving information including a plurality of data items, extracting said plurality of data items from said information transmitted towards said client, based on said extracted data, transmitting to said client said extracted data and information that realizes at said client an interface to display said data in whole and to designate transfer of said extracted data to said terminal, receiving from said client transfer request data requesting transfer of a data item selected from said extracted plurality of data items to said terminal, and converting said data item into a data format corresponding to said terminal of a predetermined transfer destination stored in said terminal information storage circuit for transfer to said terminal, based on said transfer request data received at said step of receiving transfer request data.

2. The information transfer method according to claim 1, wherein said step of transmitting said extracted data item and interface information comprises the step of extracting said plurality of data items from said information transmitted towards said client, and transmitting to said client said extracted data items and interface information that realizes at said client an interface appearing in response to specifying a display region of a data item corresponding to said extracted data item to select respective data items corresponding to said extracted data items, based on said extracted data items.

3. The information transfer method according to claim 1, wherein said step of transferring a data item comprises the step of converting said data item into a data format corresponding to said terminal of a predetermined transfer destination prepared at said step of preparing said terminal information, and adding information other than the data item received from said server to said converted data item for transfer to said terminal, based on said transfer request data received at said step of receiving transfer request data.

4. The information transfer method according to claim 1, wherein said step of preparing terminal information comprises the step of receiving said terminal information from said client and preparing terminal information according to said received terminal information.

5. The information transfer method according to claim 2, wherein said server is a World Wide Web server, and said information relates to a web page, said interface including a select button to select a data item in said display region from said plurality of data items, said select button appearing at least inside said display region or in a neighborhood of said display region in response to specifying respective display regions of said extracted plurality of data items from said web page.

6. The information transfer method according to claim 5, wherein said interface includes a transfer destination select button to select a transfer destination of a selected data item, and a data select button to select a data item of said display region from said plurality of data items, said data select button appearing at least inside said display region or in a neighborhood of said display region in response to specifying respective display regions of said extracted plurality of data items from said web page.

7. The information transfer method according to claim 5, wherein said interface includes a data select button to select a data item of said display region from said plurality of data items, and a transfer destination select button to select a transfer destination of said selected data item, said data select button and said transfer destination select button appearing at least in said display region or in a neighborhood of said display region in response to specifying respective display regions of said extracted plurality of data items from said web page.

8. A computer-readable recording medium recorded with a program realizing an information transfer method transferring to a terminal information transmitted from a server connected to a network to a client, said information transfer method comprising the steps of:

preparing terminal information for said terminal to which said information is to be transferred, including a destination address for use in transferring said information, receiving information including a plurality of data items, transmitted from said server towards said client, storing said information received at said step of receiving information including a plurality of data items, extracting said plurality of data items from said information transmitted towards said client, based on said extracted data, transmitting to said client said extracted data and information that realizes at said client an interface to display said data in whole and to designate transfer of said extracted data to said terminal, receiving from said client transfer request data requesting transfer of a data item selected from said extracted plurality of data items to said terminal, and converting said data item into a data format corresponding to said terminal of a predetermined transfer destination stored in said terminal information storage circuit for transfer to said terminal, based on said transfer request data received at said step of receiving transfer request data.

9. The recording medium according to claim 8, wherein said step of transmitting said extracted data item and interface information comprises the step of extracting said plurality of data items from said information transmitted towards said client, and transmitting to said client said extracted data items and interface information that realizes at said client an interface appearing in response to specifying a display region of a data item corresponding to an extracted data item to select respective data items corresponding to said extracted data items, based on said extracted data items.

10. The recording medium according to claim 8, wherein said step of transferring said data item comprises the step of converting said data item into a data format corresponding to said terminal of a predetermined transfer destination prepared at said step of preparing terminal information, and adding information other than the data item received from said server to said converted data item for transfer to said terminal, based on said transfer request data received at said step of receiving transfer request data.

11. The recording medium according to claim 8, wherein said step of preparing terminal information comprises the step of receiving said terminal information from said client and preparing terminal information according to said received terminal information.

12. The recording medium according to claim 9, wherein said server is a World Wide Web server, and said information relates to a web page, said interface including a select button to select a data item in said display region from said plurality of data items, said select button appearing at least inside said display region or in a neighborhood of said display region in response to specifying respective display regions of said extracted plurality of data items from said web page.

13. The recording medium according to claim 12, wherein said interface includes a transfer destination select button to select a transfer destination of a selected data item, and a data select button to select a data item of said display region from said plurality of data items, said data select button appearing at least inside said display region or in a neighborhood of said display region in response to specifying respective display regions of said extracted plurality of data items from said web page.

14. The recording medium according to claim 12, wherein said interface includes a data select button to select a data item of said display region from said plurality of data items, and a transfer destination select button to select a transfer destination of said selected data item said data select button and said transfer destination select button appearing at least in said display region or in a neighborhood of said display region in response to specifying respective display regions of said extracted plurality of data items from said web page.

15. An information transfer apparatus transferring, to a terminal, information transmitted from a server connected to a network to a client, said information transfer apparatus comprising:

a communication system connected to said network for transmitting and receiving information with respect to another apparatus, terminal information storage for storing terminal information including a destination address used in transferring said information to said terminal, first reception device connected to said communication system for receiving information including a plurality of data items, transmitted from said server towards said client, data storage connected to said communication system for storing said information received by said first reception device, a data transmission device connected to said communication system for extracting said plurality of data items from said information transmitted towards said client, and based on said extracted data, transmitting to said client said extracted data and information that realizes at said client an interface to display said data in whole and to designate transfer of said extracted data to said terminal, second reception device connected to said communication system for receiving, from said client, transfer request data requesting transfer of a data item selected from said extracted plurality of data items to said terminal, and a transfer section connected to said communication system, said data storage, and said terminal information storage for converting said data item into a data format corresponding to said terminal of a predetermined transfer destination stored in said terminal information storage for transfer to said terminal, based on said transfer request data received by said second reception device.

16. The information transfer apparatus according to claim 15, wherein said data transmission device comprises a section for extracting said plurality of data items from said information transmitted towards said client, and transmitting to said client said extracted data items and interface information that realizes at said client an interface appearing in response to specifying a display region of a data item corresponding to said extracted data items to select respective data items corresponding to said extracted data items, based on said extracted data items.

17. The information transfer apparatus according to claim 15, wherein said transfer section comprises a section for converting said data item into a data format corresponding to said terminal of a predetermined transfer destination stored in said terminal information storage, and adding information other than the data items received from said server to said converted data item for transfer to said terminal, based on said transfer request data received by said reception device.

18. The information transfer apparatus according to claim 15, further comprising a terminal information reception device connected to said communication system for receiving said terminal information from said client to store in said terminal information storage.

19. The information transfer apparatus according to claim 16, wherein said server is a World Wide Web server, and said information relates to a web page, said interface including a select button to select a data item in said display region from said plurality of data items, said select button appearing at least inside said display region or in a neighborhood of said display region in response to specifying respective display regions of said extracted plurality of data items from said web page.

20. The information transfer apparatus according to claim 19, wherein said interface includes a transfer destination select button to select a transfer destination of a selected data item, and a data select button to select a data item of said display region from said plurality of data items, said data select button appearing at least inside said display region or in a neighborhood of said display region in response to specifying respective display regions of said extracted plurality of data items from said web page.

21. The information transfer apparatus according to claim 19, includes a data select button to select a data item of said display region from said plurality of data items, and a transfer destination select button to select a transfer destination of said selected data item, said data select button and said transfer destination select button appearing at least in said display region or in a neighborhood of said display region in response to specifying respective display regions of said extracted plurality of data items from said web page.

22. An information transfer apparatus transferring, to a terminal, information transmitted from a server connected to a network to a client, said information transfer apparatus comprising:

a communication circuit connected to said network for transmitting and receiving information with respect to another apparatus, a terminal information storage circuit for storing terminal information including a destination address used in transferring said information to said terminal, a first reception circuit connected to said communication circuit for receiving information including a plurality of data items, transmitted from said server towards said client, a data storage circuit connected to said communication circuit for storing said information received by said first reception circuit, a data transmission circuit connected to said communication circuit for extracting said plurality of data items from said information transmitted towards said client, and based on said extracted data, transmitting to said client said extracted data and information that realizes at said client an interface to display said data in whole and to designate transfer of said extracted data to said terminal, a second reception circuit connected to said communication circuit for receiving from said client transfer request data requesting transfer of a data item selected from said extracted plurality of data items to said terminal, and a transfer circuit connected to said communication circuit, said data storage circuit, and said terminal information storage circuit for converting said data item into a data format corresponding to said terminal of a predetermined transfer destination stored in said terminal information storage circuit for transfer to said terminal, based on said transfer request data received by said second reception circuit.

23. The information transfer apparatus according to claim 22, wherein said data transmission circuit comprises a circuit for extracting said plurality of data items from said information transmitted towards said client, and transmitting to said client said extracted data items and interface information that realizes at said client an interface appearing in response to specifying a display region of a data item corresponding to said extracted data items to select respective data items corresponding to said extracted data items, based on said extracted data items.

24. The information transfer apparatus according to claim 22, wherein said transfer circuit comprises a circuit for converting said data item into a data format corresponding to said terminal of a predetermined transfer destination stored in said terminal information storage circuit, and adding information other than the data items received from said server to said converted data item for transfer to said terminal, based on said transfer request data received by said reception circuit.

25. The information transfer apparatus according to claim 22, further comprising a terminal information reception circuit connected to said communication circuit for receiving said terminal information from said client to store in said terminal information storage circuit.

26. The information transfer apparatus according to claim 23, wherein said server is a World Wide Web server, and said information relates to a web page, said interface including a select button to select a data item in said display region from said plurality of data items, said select button appearing at least inside said display region or in a neighborhood of said display region in response to specifying respective display regions of said extracted plurality of data items from said web page.

27. The information transfer apparatus according to claim 26, wherein said interface includes a transfer destination select button to select a transfer destination of a selected data item, and a data select button to select a data item of said display region from said plurality of data items, said data select button appearing at least inside said display region or in a neighborhood of said display region in response to specifying respective display regions of said extracted plurality of data items from said web page.

28. The information transfer apparatus according to claim 26, wherein said interface includes a data select button to select a data item of said display region from said plurality of data items, and a transfer destination select button to select a transfer destination of said selected data item, said data select button and said transfer destination select button appearing at least in said display region or in a neighborhood of said display region in response to specifying respective display regions of said extracted plurality of data items from said web page.

* * * * *